United States Patent
Albertini et al.

(10) Patent No.: US 6,555,294 B1
(45) Date of Patent: Apr. 29, 2003

(54) METHOD FOR COLLECTIVE PRODUCTION OF MAGNETIC HEADS WITH ROUNDED BEARING SURFACE

(75) Inventors: Jean-Baptiste Albertini, Grenoble (FR); Pierre Gaud, Coublevie (FR); Gérard Barrois, Le Fontanil (FR); Henri Sibuet, Le Fontanil (FR)

(73) Assignee: Commissariat a l'Energie Atomique, Paris (FR)

( * ) Notice: Subject to any disclaimer, the term of this patent is extended or adjusted under 35 U.S.C. 154(b) by 0 days.

(21) Appl. No.: 09/744,667

(22) PCT Filed: Jul. 27, 1999

(86) PCT No.: PCT/FR99/01839

§ 371 (c)(1),
(2), (4) Date: Jan. 29, 2001

(87) PCT Pub. No.: WO00/07180

PCT Pub. Date: Feb. 10, 2000

(30) Foreign Application Priority Data

Jul. 28, 1998 (FR) .............................................. 98 09641

(51) Int. Cl.⁷ .......................... G11B 5/00; G11B 5/127; G11B 5/31; G11B 5/33; G11B 5/187

(52) U.S. Cl. ...................... 430/311; 430/311; 430/313; 430/316; 430/319; 29/603.15; 360/328; 216/65

(58) Field of Search ................................. 438/463, 460; 216/62, 65, 94; 638/940; 430/311

(56) References Cited

U.S. PATENT DOCUMENTS

| | | | | |
|---|---|---|---|---|
| 3,843,865 A | * | 10/1974 | Nath | 219/121.6 |
| 4,418,472 A | * | 12/1983 | Lorenze, Jr. | 29/603.14 |
| 4,952,771 A | * | 8/1990 | Wrobel | 219/121.67 |
| 5,067,230 A | * | 11/1991 | Meunier et al. | 29/603.13 |
| 5,167,062 A | * | 12/1992 | Castera et al. | 29/603.14 |
| 5,189,580 A | * | 2/1993 | Pisharody et al. | 360/126 |
| 5,604,973 A | * | 2/1997 | Gaud et al. | 29/603.15 |
| 5,718,036 A | * | 2/1998 | Oji et al. | 29/603.12 |
| 5,722,156 A | * | 3/1998 | Balfrey | 29/603.08 |
| 5,739,048 A | * | 4/1998 | Kerth et al. | 438/462 |
| 5,756,237 A | * | 5/1998 | Amemiya | 430/5 |
| 5,842,269 A | * | 12/1998 | Albertini et al. | 29/603.01 |
| 5,874,011 A | * | 2/1999 | Ehrlich | 216/65 |
| 6,316,282 B1 | * | 11/2001 | Zhang | 438/48 |
| 6,387,574 B1 | * | 5/2002 | Amemiya | 430/5 |

FOREIGN PATENT DOCUMENTS

| | | | |
|---|---|---|---|
| EP | 0-404-340 | * | 5/1990 |
| EP | 0-515-983 | * | 5/1992 |
| JP | 60-029914 | * | 2/1985 |
| JP | 62-132210 | * | 6/1987 |

\* cited by examiner

*Primary Examiner*—John A. McPherson
*Assistant Examiner*—Kripa Sagar
(74) *Attorney, Agent, or Firm*—Oblon, Spivak, McClelland, Maier & Neustadt, P.C.

(57) ABSTRACT

A process for collectively making integrated magnetic heads with a bearing surface obtained by photolithography. According to the process, on a wafer is deposited a plurality of heads, a mask defining the profile of the bearing surfaces and the wafer is collectively engraved in the vicinity of the pole pieces of the heads. Such a process may find particular application to the making of magnetic heads.

14 Claims, 8 Drawing Sheets

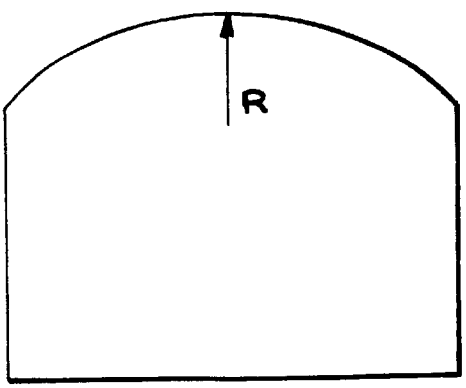
FIG. 11A
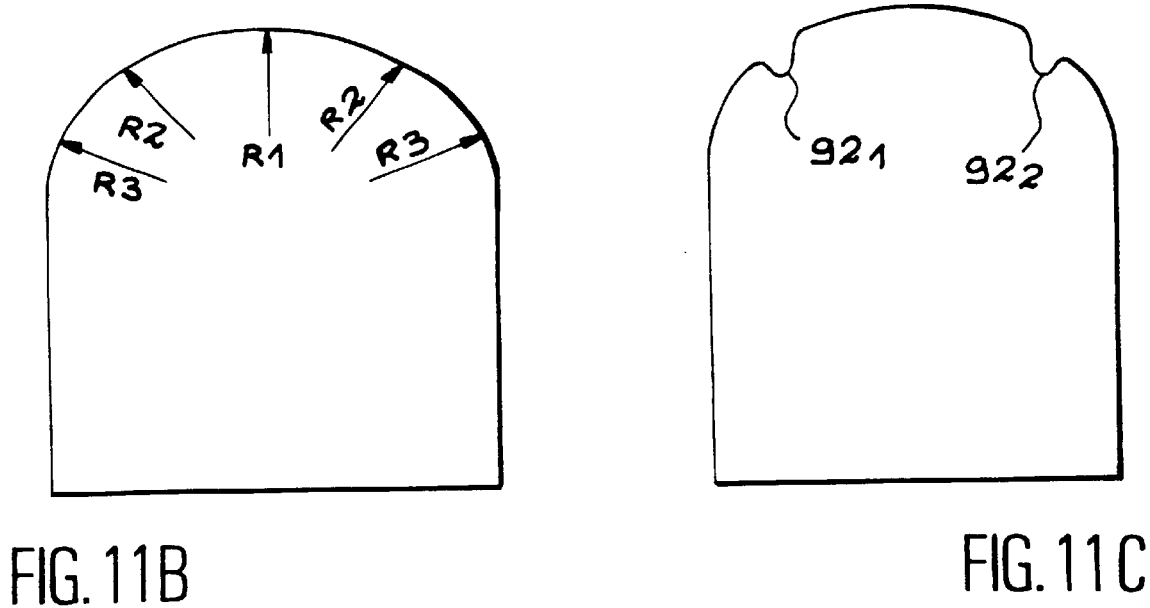
FIG. 11B
FIG. 11C
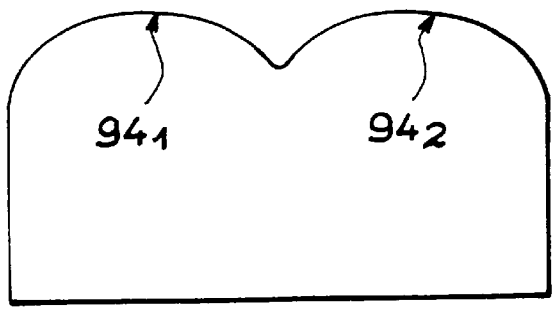
FIG. 11D

METHOD FOR COLLECTIVE PRODUCTION OF MAGNETIC HEADS WITH ROUNDED BEARING SURFACE

BACKGROUND OF THE INVENTION

1. Technical Field

The object of the present invention is a process for collectively making integrated magnetic heads with a rounded bearing surface.

It finds an application in the making of helical magnetic tape recording heads, particularly for consumer or professional video recording (living room video recorders, camcorders) or again for computer data tape or disk recorders. It also finds application in other recording heads for tapes, disks, cards, etc.

The high frequencies permitted by the small size of integrated thin film heads allow digital recording (for example in accordance with the DVC standard for video, or DDS for IT). Data tape recorders are computer file stores having the largest storage capacities and the lowest costs. Computer applications are data storage, hard disk back-up systems for a system or a large software or database broadcasting network. In the field of video recording, it is conceivable for video recorder applications to be broadened to those of a video server centralising several films.

2. Field of the Invention

The appended FIGS. 1 to 3 show the structure of a component for a thin film integrated magnetic head according to the document FR-A-2 747 226. As shown the head includes (FIG. 1), two pole pieces $10_1$, $10_2$ separated by an air-gap 14, two magnetic branches $16_1$, $16_2$ partially covering the pole pieces, and a magnetic flux close piece 18. These pieces taken together constitute a magnetic circuit. Around the branches $16_1$, $16_2$ are found conductor windings $20_1$, $20_2$ providing read and/or write of the written and/or read data on a recording medium not shown.

FIG. 2 shows the complete head with two conductor bands $22_1$, $22_2$ allowing access to the conductor windings $20_1$, $20_2$ and two electrical connection jacks $24_1$, $24_2$.

The head shown in FIGS. 1 and 2 may be made in a collective way using technologies borrowed from microelectronics. To obtain an individual magnetic head from a wafer including a plurality of components, the components may be separated from each other, by ordering them for example in a matrix structure, then by cutting them along straight paths. By machining the front part of the components, each head, in the vicinity of the pole pieces $10_1$, $10_2$, is given a bearing surface of rounded shape necessary for the proper operation of the head. In FIG. 2, the rounded profile is shown diagrammatically by the line 26. This operation is carried out mechanically on each head.

FIG. 3 shows, in a diagrammatic way, a head seen in cross-section along one of the conductor bands and one of the branches of the magnetic circuit. A substrate 30, for example of silicon, may be seen with one of the pole pieces $10_1$, or $10_2$, a magnetic branch $16_1$, or $16_2$, a magnetic close piece 18, a conductor band $22_1$, or $22_2$ and the electrical connection jacks $24_1$, $24_2$. The whole is covered by a superstrate 40, for example of silicon. Towards the front of the head, the surface 26, called a bearing surface, has an appropriate rounded shape. Towards the back, the superstrate 40 is disengaged so as to reveal the electrical connection jacks $24_1$, $24_2$.

Although the processes for making such magnetic heads are largely collective, the fact is nonetheless that the final stage of manufacturing the bearing surface 26 is individual and adds considerably to the final cost of each head. However, through the document U.S. Pat. No. 4,418,472, a collective process is known which uses ion machining but which is only applied to straight surfaces. This process is not appropriate for rounded surfaces with, additionally, the low dimensions of current digital recording heads. The radius of curvature of the head near the air-gap is an essential parameter in obtaining good head/band contact, and therefore good quality of recording and control of wear and tear: too large or too small a radius of curvature may lead either to bad contact quality (and therefore excessive attenuation of the head signal), or to accelerated wearing of the head. Furthermore, grinding makes it difficult to machine very precise radii of curvature or different radii of curvature on the bearing surface.

SUMMARY OF THE INVENTION

Indeed the purpose of the present invention is to overcome these drawbacks.

To this end, the invention proposes a process for collectively making integrated magnetic heads wherein:

- on a wafer are made a plurality of components each including means able to constitute at least one magnetic head and particularly pole pieces separated by an air-gap,
- the wafer is machined collectively so as to give to all the components, in the vicinity of the pole pieces, a surface having an appropriate shape;
- the components are then separated, the surface thus engraved in the vicinity of the pole pieces constituting the bearing surface of each of the heads, this process being characterised in that said appropriate shape is a rounded shape with at least one radius of curvature, wherein the wafer is machined collectively either by masked photolithography, or by cutting by means of a laser beam.

In a first alternative:

- on the wafer is deposited at least one mask including as many patterns as components on the wafer, each pattern having, opposite the pole pieces of each component, an edge of rounded shape;
- the wafer is engraved collectively by photolithography through this mask or these mask to give to all the components, in the vicinity of the pole pieces, a surface having said rounded shape.

In a second alternative, a laser beam able to cut the wafer at least partially is directed onto the wafer and the laser beam is moved along a rounded path. Preferably, the laser beam is guided by a jet of liquid at high pressure, for example water.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIGS. 11A to 11D show various profiles of bearing surfaces which can be made with the invention for components with one or more heads;

DESCRIPTION OF THE PREFERRED EMBODIMENTS

Figure 1:
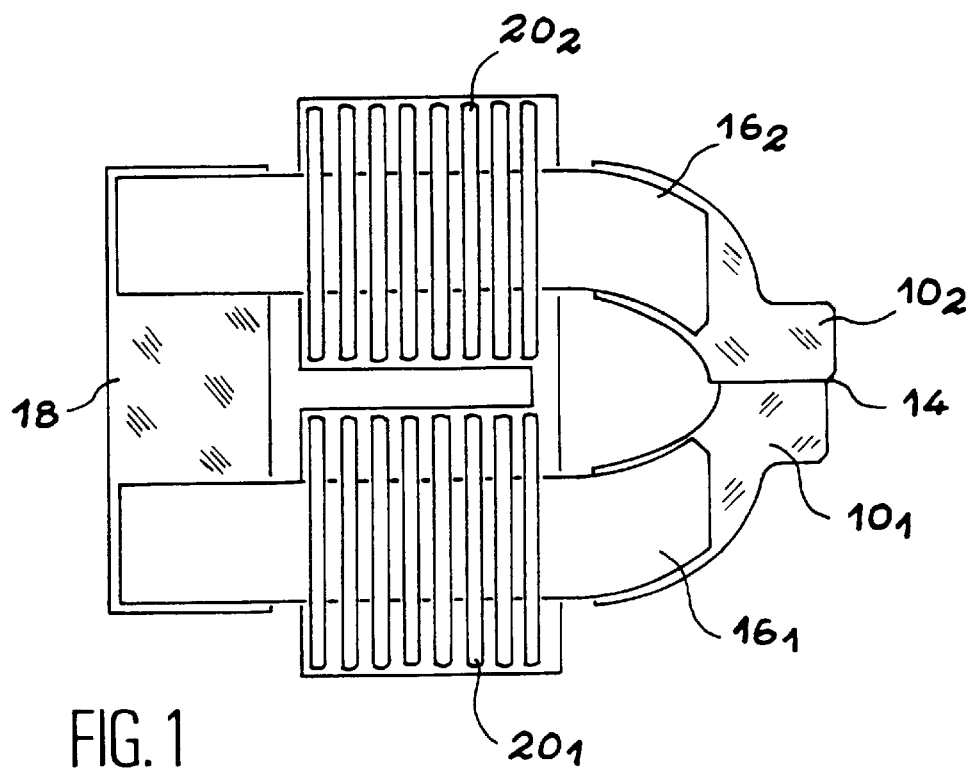
FIG. 1, already described, shows a magnetic head according to the prior art.
Figure 2:
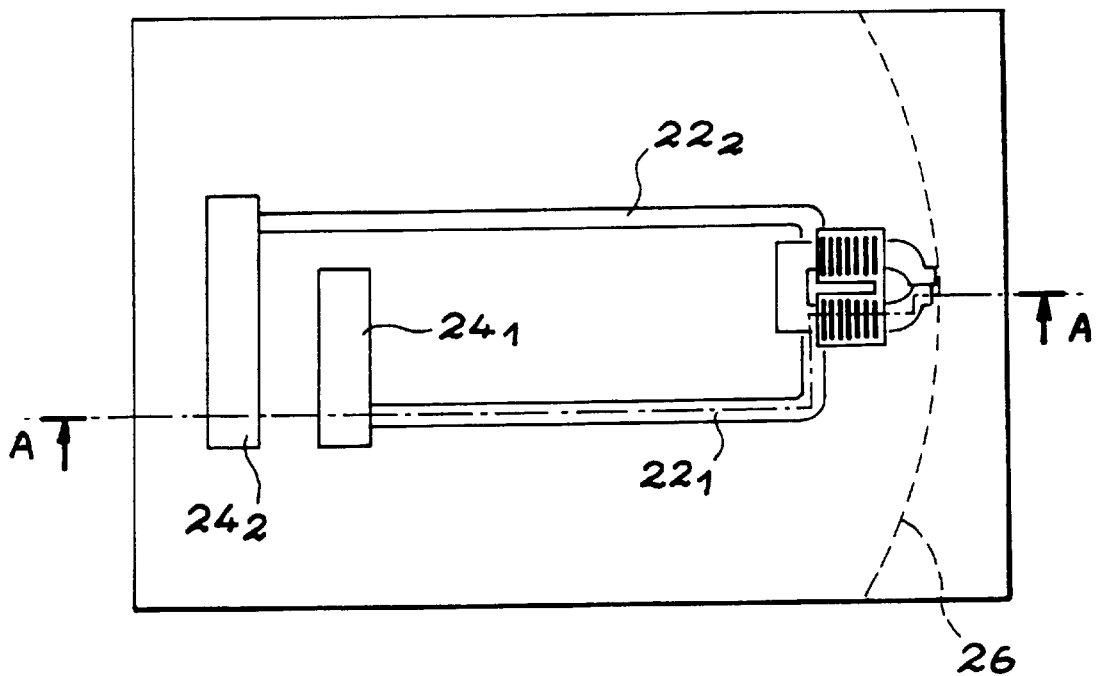
FIG. 2, already described, shows, in a view from above, a magnetic head with its electrical connection jacks.
Figure 3:
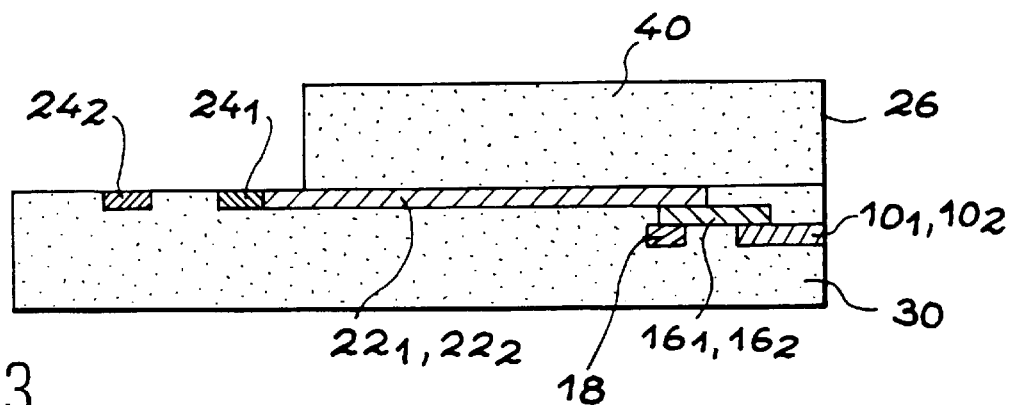
FIG. 3, already described, shows the same head in cross-section.
Figure 4:
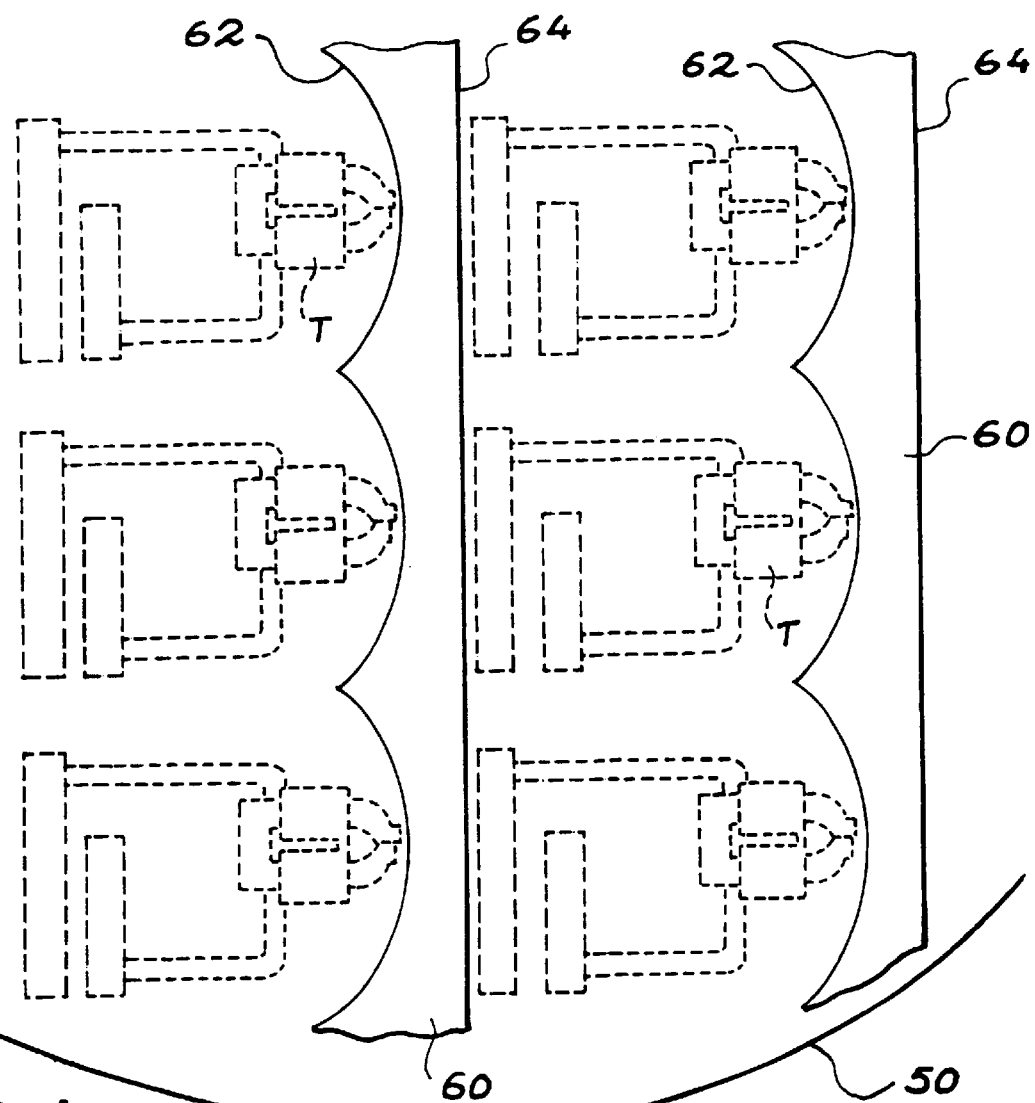
FIG. 4 shows, in a view from above, a wafer with the part to be engraved so as to obtain, collectively, by photolithography, heads with bearing surfaces of the appropriate shape.

In FIG. 4 can be seen a wafer 50 with components T. These components each include the elements shown in FIG. 2. This wafer is obtained by any known collective process and particularly by the process described in the document FR-A-2 747 226 already cited. In accordance with the first invention alternative, this wafer is covered with a mask of an appropriate shape to engrave the referenced zones 60.

In the alternative shown, this mask is formed of bands with periodic patterns each having a front edge 62 of rounded shape appropriate to the making of a bearing surface, and a straight back edge 64. The front edge 62 overlaps the pole pieces of the different heads and the back edge 64 is withdrawn from the connection jacks.

Figure 5:
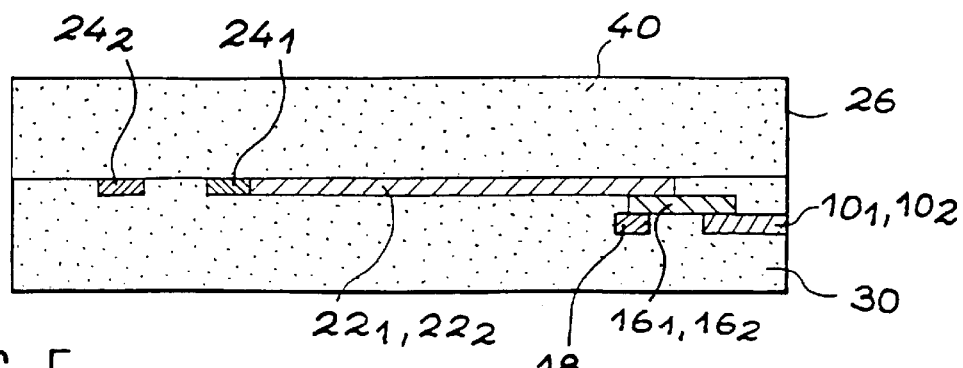
FIG. 5 shows in cross-section the head, before disengagement of the jacks.

FIG. 5 shows, in cross-section, the head obtained with a process using a mask according to FIG. 4, the jacks not being yet disengaged.

Figure 6:
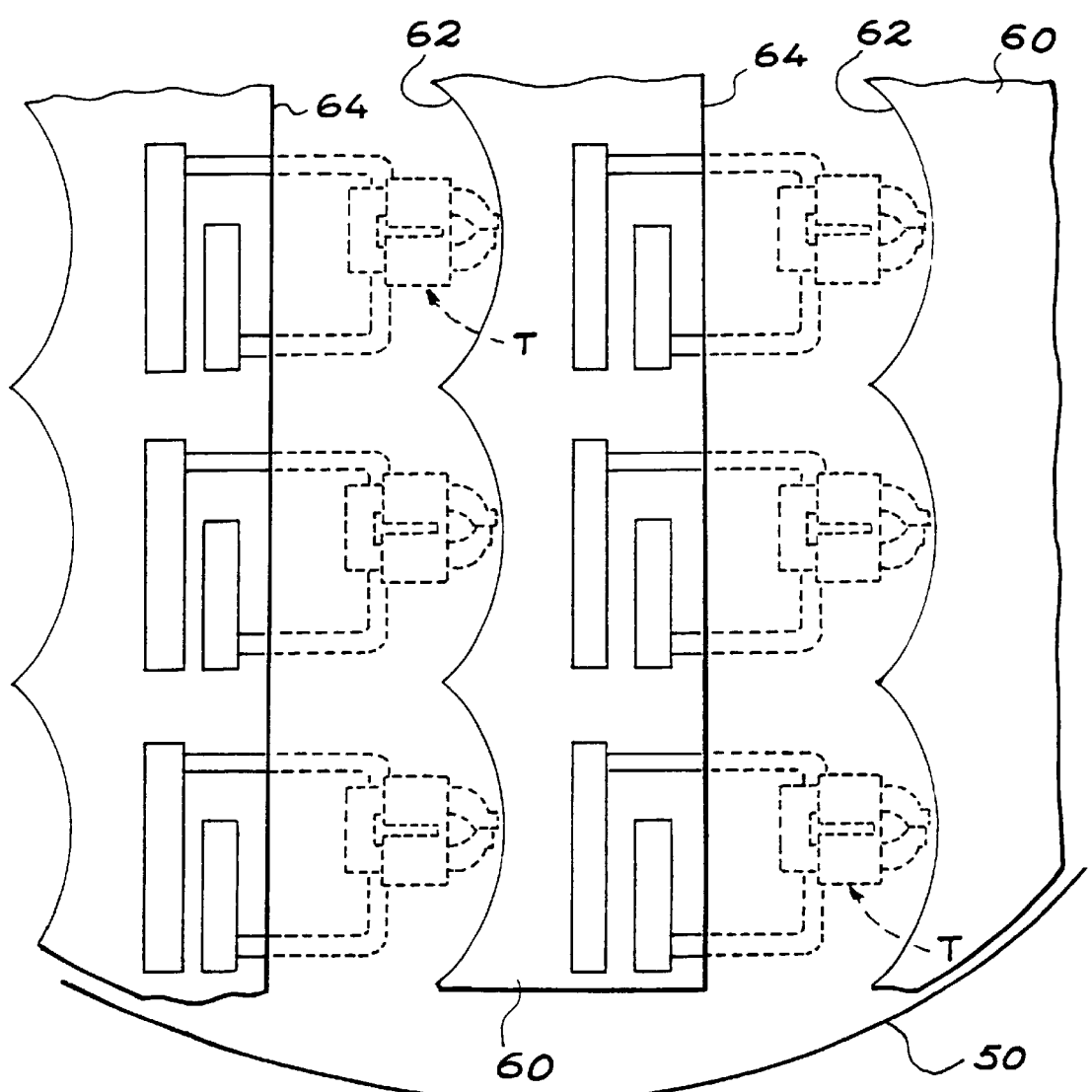
FIG. 6 shows the position of a part to be engraved.

FIG. 6 shows the position of the parts 60 to be engraved according to the second process, so as to obtain, in addition to the required shape for the bearing surface partially obtained with the first mask, a restoration of contact on the head jacks.

Figure 7:
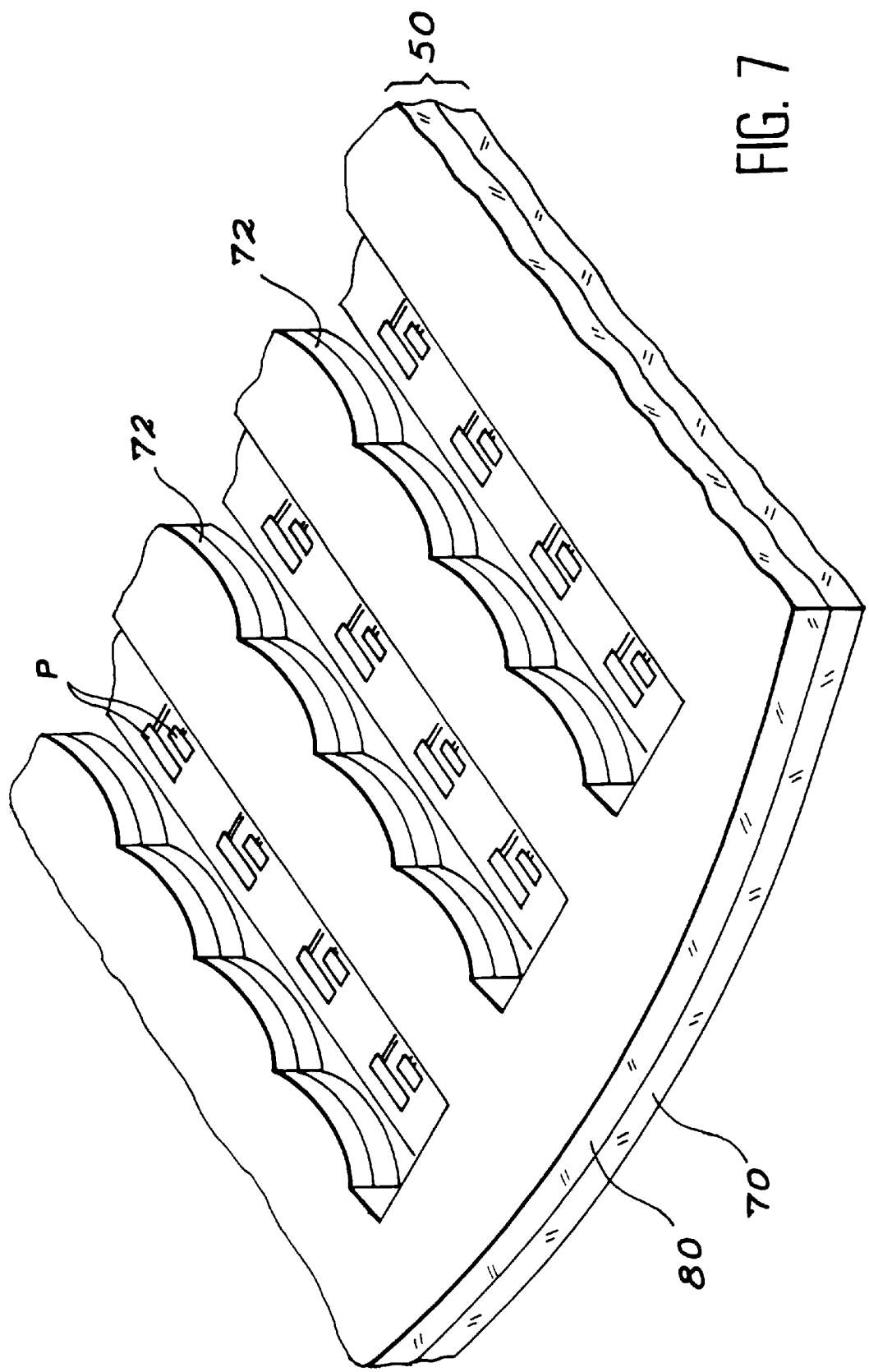
FIG. 7 shows, in perspective, a wafer after definition of the bearing surface and disengagement of the jacks.

FIG. 7 shows the wafer once lithography has been applied through the mask 60. In this figure can also be seen the substrate 70 and the superstrate 80 coming to cover the heads. After lithography, the superstrate and at least a part of the substrate are engraved which gives the bearing surfaces a rounded surface 72. Furthermore, as previously described, an additional lithography stage makes it possible to disengage the connection jacks P. The periphery of the wafer is not engraved, which allows a certain rigidity to be preserved.

Figure 8:
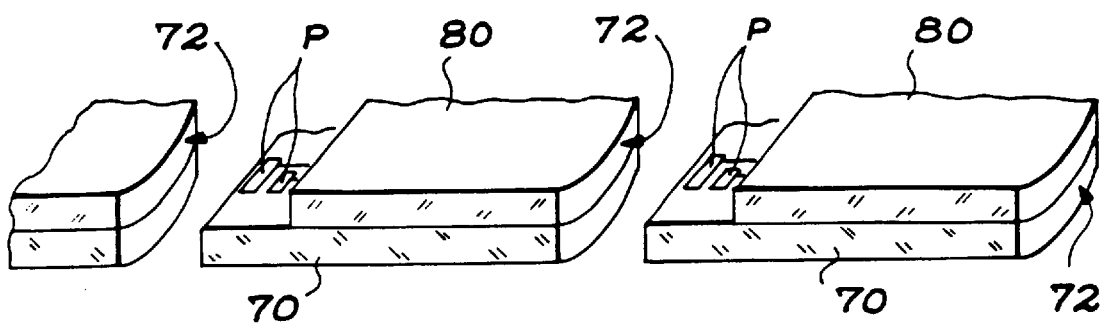
FIG. 8 shows a deep through engraving.

FIG. 8 shows a part of the wafer in the case where the engraving carried out comes through onto the other face of the substrate 70. The disengagement of the jacks is obtained in the same way, by additional lithography which stops for example on a barrier layer, for example of silicon, deposited on the substrate when making the heads. In the alternative in FIG. 8, the wafer is thus cut into strips each containing a plurality of heads from which the bearing surface 72 is formed and from which the connection jacks P are disengaged. It remains to separate these heads, which may be obtained by sawing.

Figure 9:
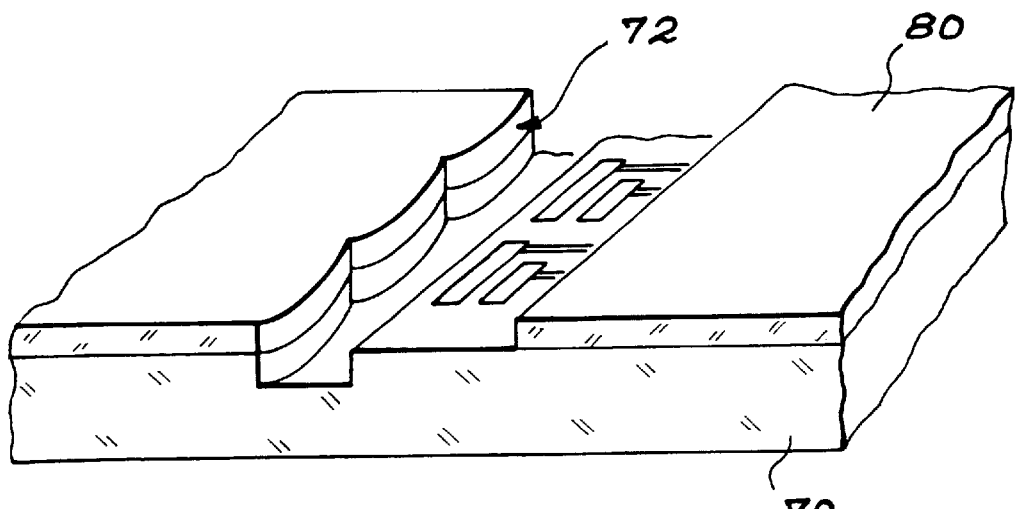
FIG. 9 shows, in cross-section, a non-through engraving.

FIG. 9 shows a different implementation mode where the engraving does not come through. The references denote the same elements as in FIG. 8. As a strictly non-restrictive example, the engraving may have a width (in the plane of the figure) of 50 μm and the engraved platter at connection jacks level a width (still in the plane of figure) of 500 μm. The superstrate 80 may possibly be thinned before the deposit of the mask, until a thickness of about 150 μm is obtained, whereas the substrate 70 may have a thickness of about 500 μm. The bottom of the engraved channel may be, for example, 300 μm from the top of the superstrate.

The process may be continued, separating the strips by thinning (full slice) the substrate 70 until the level of the engraved channel is reached.

Figure 10:
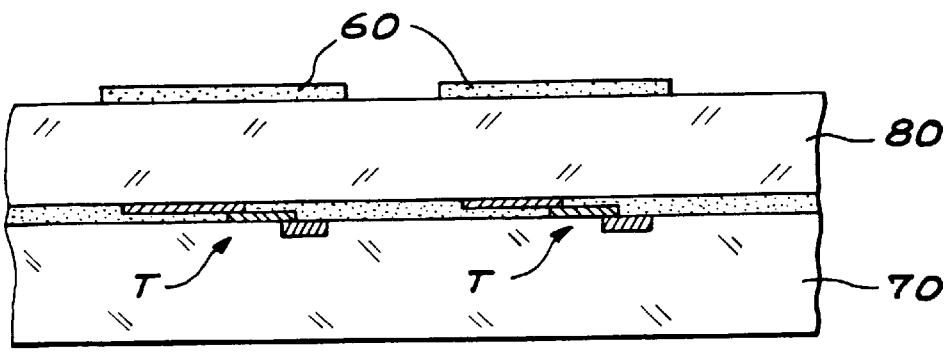
FIGS. 10A to 10E show stages of another particular mode of implementation of the process of the invention according to an alternative with two symmetrical engravings.
Figure 10:
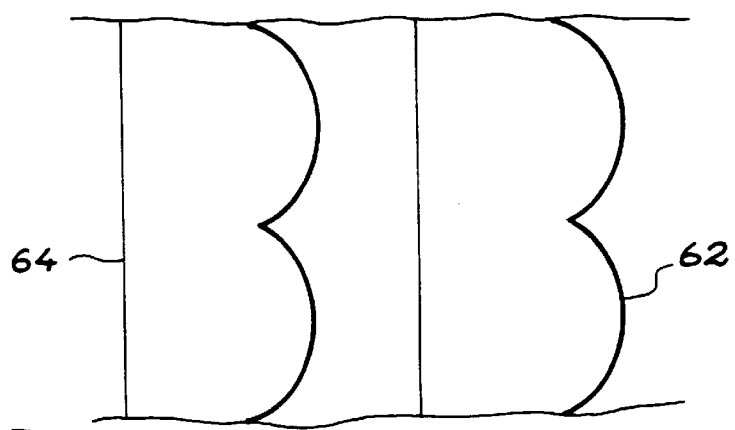
Figure 10:
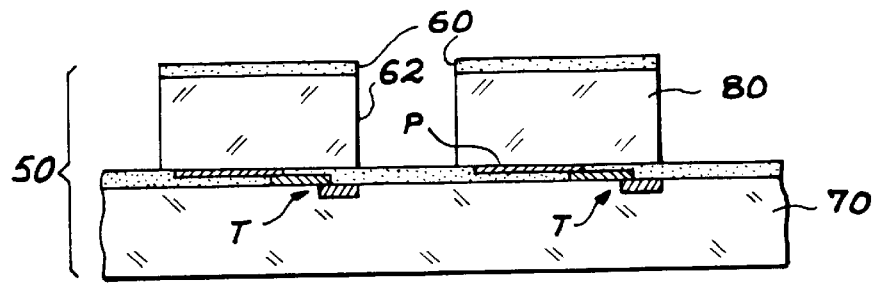
Figure 10:
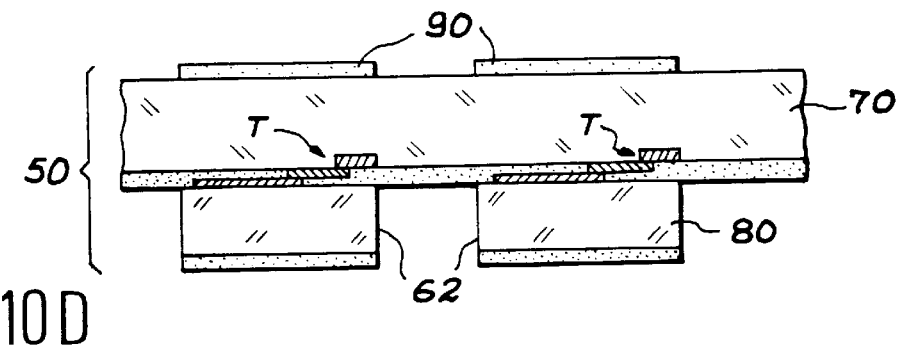
Figure 10:
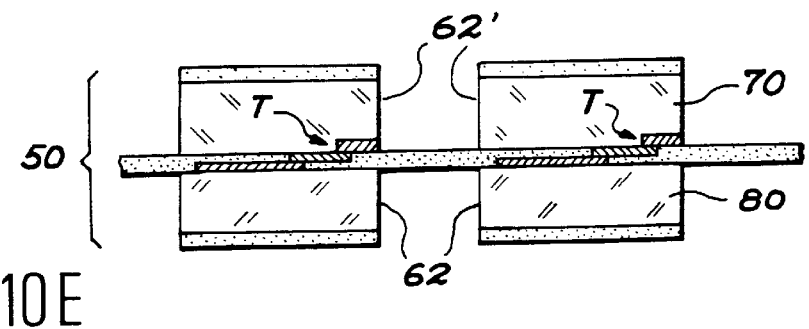

This first alternative of the invention may be implemented otherwise by using two symmetrical engravings with reversal of the wafer as shown in FIGS. 10A to 10E. In FIG. 10A, can be seen, in cross-section, the substrate 70, the heads T, the superstrate 80 and the mask 60. The shape of the latter appears in FIG. 10B, with its patterns delimited by a front edge 62 of rounded shape and a back edge 64 straight in shape. FIG. 10C shows a first engraving making it possible to form the bearing surfaces 62. The disengagement of the connection jacks is not shown in this figure. It may be achieved by engraving (photolithographic or mechanical) carried out simultaneously, before or after the first engraving. The whole is then reversed, as shown in FIG. 10D, and onto the substrate 70 is deposited a second mask 90 which is engraved by alignment on the previously effected engraving. A second engraving symmetrical to the first and affecting the superstrate 70 up to the level of the heads is then operated, which produces a surface 61' (FIG. 10E). It then remains to separate the heads for example by sawing or by breaking possibly followed by a polishing of the bearing surface.

The advantage of the implementation mode with a single through engraving (FIG. 8) compared with the implementation mode with two symmetrical engravings (FIGS. 10A to 10E) is that there is no mask alignment to provide, furthermore the engraving profile is continuous, which facilitates the finishing stage.

But dual symmetrical engraving does also have advantages. Indeed, the technology of manufacturing integrated heads often entails the presence of materials of different natures in the thickness of the wafer. For example, if the heads are made in silicon oxide chambers on a silicon substrate and if a silicon superstrate is deposited, in the midst of a unit almost entirely constituted of silicon will be found a thin film of silicon oxide containing at certain points the active parts of the heads. The deep engraving used in the first implementation mode could be difficult to achieve in such a non-homogenous material. In this case, dual face engraving may be advantageous. The two engravings will stop on the layer of different nature (for example of silicon oxide). The thin film subsisting may then be engraved or sawed or broken. A subsequent finish will remove debris and will make the profile of this thin film compliant with the rest of the bearing surface machined by the deep engravings.

FIGS. 11A to 11D, lastly, show some examples of bearing surface profiles able to be obtained by means of the invention. In FIG. 11A the radius of curvature R is single. In FIG. 11B, the radius of curvature changes and takes a value R1 at the centre then a value R2 on the sides and a value R3 at the ends. In FIG. 11C, the bearing surface contains two concave parts 92, and 922. FIG. 11D shows a dual profile 94, and 942 effective for a dual head also called a twin-headed component of course, these examples are not restrictive, components with more than two heads are also conceivable.

Figure 12:
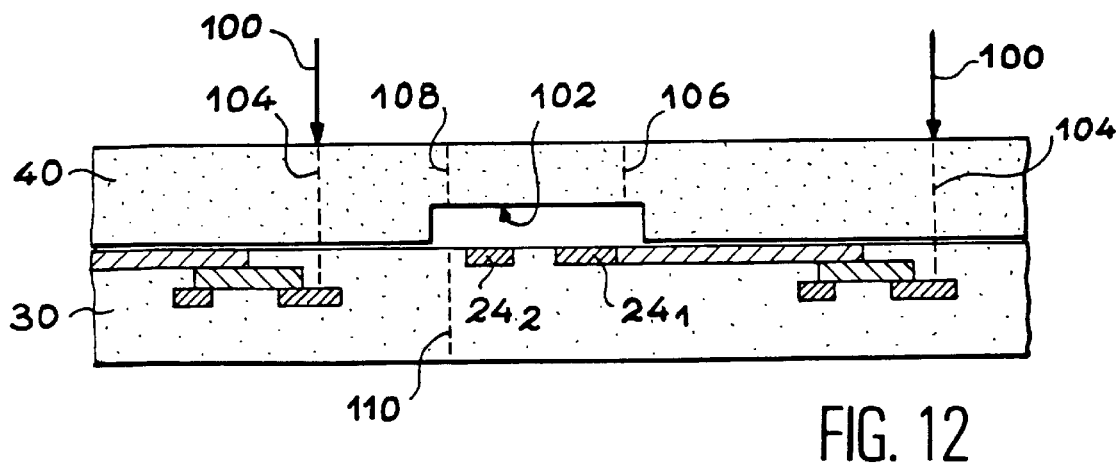
FIG. 12 shows, in cross-section, laser cutting paths.
Figure 13:
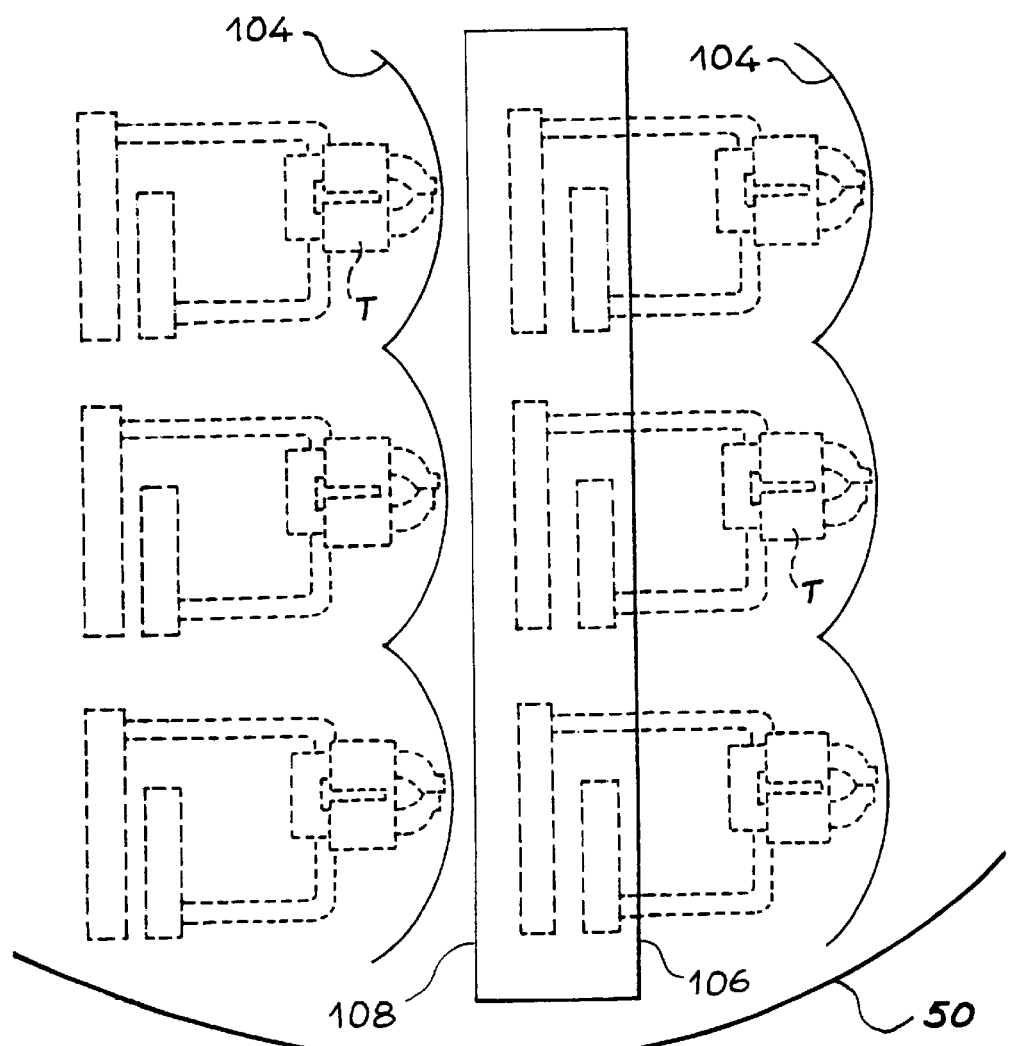
FIG. 13 shows in a view from above these laser cutting paths and the disengagement zone of the contact restorations.

FIGS. 12 and 13 show the second alternative of the invention using cutting by laser beam guided particularly by a jet of liquid at high pressure, for example water.

FIG. 12 shows the superstrate 40 previously machined by a grooving 102 placed in such a way that after assembly on the substrate 30 the grooving is above the connection jacks $24_1, 24_2$. The laser cut is made along the path marked by the arrows 104. The laser beam is symbolised by the arrows 100. This cut gives the components, in the vicinity of the pole pieces, the requisite rounded shape. The connection jacks may be disengaged by disengaging the part located above the grooving 102, for example by laser cutting or mechanical sawing along the lines 106 and 108. Contrary to the cutting path 104, which is rounded, the lines 106 and 108 are straight.

FIG. 13 shows in a view from above these different laser cutting paths 104 and cutting lines 106, 108.

A final cut along the line 110 allows the heads to be separated.

Multiple alternatives are possible for disengaging the connection jacks:

either by through grooving of the superstrate (saw, grinder, laser or any other means of engraving) before assembly on the substrate, or by non-through grooving of the superstrate (grinder or some kind of engraving) before assembly, then cutting which is
1) partial along the path 106 (reduced power laser, saw, partial engraving, etc.) and complete along the paths 108 and 110 (laser, saw),
2) or partial over the whole zone to be disengaged between the paths 106 and 108 (grinder, some kind of engraving), then a complete cut along the path 110, or by photolithography then engraving of the superstrate between the paths 106 and 108 followed by cutting (saw, laser, etc.) along the path 110.

The advantages obtained through the invention, whatever the implementation mode (photolithography or laser cutting) are numerous compared with previous techniques.

firstly, the process of the invention makes it possible to machine several thousand heads at once;

then, it leads to good reproducibility of the shape given to each bearing surface; the radius of curvature of the head near the air-gap is determinant in the quality of the recording head/medium contact;

the invention makes it possible additionally to obtain complex shapes with a curvature changing along the bearing surface, which was very difficult if not impossible with mechanical technology, especially for small head sizes;

contrary to grinders, which often need to be trued up, neither the masks nor the laser used in the invention wear out, which eliminates shape drifts over time.

The processes which have just been described may be combined with a process making it possible to thin the part of the heads in contact (or in quasi-contact) with the recording medium. Such a process is described and claimed in French patent application no. 98 09642 with the title "Process for collectively making integrated magnetic heads with a bearing surface of a determined height" filed by the present Applicant. The thinning operations may proceed or follow the bearing surface formation operation or even be concomitant.

What is claimed is:

1. A process for collectively making integrated magnetic heads, comprising:

forming on a wafer a plurality of components each including magnetic pole pieces separated by an air-gap, collectively forming a rounded shape with at least one radius of curvature in the vicinity of the pole pieces of each component; and separating the components into discrete magnetic head devices having the rounded shape as a bearing surface, wherein the collectively forming step comprises at least one of masked photolithography and cutting by using a laser beam.

2. A process according to claim 1, wherein said collectively forming step comprises:

depositing on the wafer at least one mask including as many patterns as components on the wafer, each pattern having, opposite the pole pieces of each component, an edge of rounded shape; and collectively forming the rounded shape by photolithography through the at least one mask.

3. A process according to claim 2, wherein each component includes as a front, said pole pieces, and, as a back, electrical connection jacks, said connection jacks being disengaged.

4. A process according to claim 2, wherein a first mask is deposited on a first face of the wafer and a first non-through photolithography is effected to give the components the rounded surface, then a second mask is deposited on a second face of the wafer and a second photolithography of the wafer is effected.

5. A process according to claim 4, wherein the second photolithography does not go through said wafer.

6. A process according to claim 1, wherein said collectively forming step comprises using a laser beam to cut the wafer, said laser beam being at least partially directed onto water and moved along a rounded path.

7. A process according to claim 6, wherein the laser beam is guided by a jet of liquid at high pressure.

8. A process according to claim 6, wherein a first non-through laser cutting is effected to give the components the rounded surface.

9. A process according to claim 6, wherein each component includes, as a front, said pole pieces, and, as a back, electrical connection jacks, said connection jacks being disengaged.

10. A process according to claim 1, wherein said photolithography or said laser cutting goes through said wafer.

11. A process according to claim 1, wherein the wafer includes a substrate supporting the plurality of components and a superstrate covering the components.

12. A process according to claim 11, wherein a grooving is effected in the superstrate which grooving comes into position above connection jacks of the magnetic heads.

13. A process according to claim 11, wherein the superstrate and/or the substrate is thinned before effecting the photolithography or the laser cutting.

14. A process for collectively making integrated magnetic heads comprising:

step for collectively forming a plurality of magnetic components on a wafer;

step for collectively forming a rounded shape bearing surface for each of the magnetic components; and step for separating the plurality of magnetic components into discrete magnetic heads.

* * * * *